United States Patent [19]
Kim et al.

[11] Patent Number: 6,014,190
[45] Date of Patent: Jan. 11, 2000

[54] IN-PLANE SWITCHING LIQUID CRYSTAL DISPLAY AND A MANUFACTURING METHOD THEREOF

[75] Inventors: Hyun-Dae Kim; Byoung-Sun Na, both of Kyungki-do, Rep. of Korea

[73] Assignee: Samsung Electronics Co., Ltd., Rep. of Korea

[21] Appl. No.: 08/758,665

[22] Filed: Dec. 2, 1996

[30] Foreign Application Priority Data

Nov. 30, 1995 [KR] Rep. of Korea ...................... 95-45631
Jun. 26, 1996 [KR] Rep. of Korea ...................... 96-23819

[51] Int. Cl.⁷ ................................................. G02F 1/1343
[52] U.S. Cl. ............................ 349/39; 349/139; 349/143; 349/141
[58] Field of Search ..................... 349/141, 143, 349/139, 33, 39

[56] References Cited

U.S. PATENT DOCUMENTS

| 4,345,249 | 8/1982 | Togashi ................................... 349/141 |
| 5,598,285 | 1/1997 | Kondo et al. ........................... 349/141 |
| 5,745,207 | 4/1998 | Asada et al. ............................ 349/141 |

FOREIGN PATENT DOCUMENTS 93307154  9/1993  European Pat. Off. ...... G02F 1/1343

OTHER PUBLICATIONS

Ohta, M, et al., S30–2 Development of Super–TFT–LCDs with In–Plane Switching Display Mode, *Proceedings of the Fifteenth International Display Research Conference, Asia Display '95*, pp. 707–710 (Oct. 16–18, 1995).

*Primary Examiner*—William L. Sikes
*Assistant Examiner*—Toan Ton
*Attorney, Agent, or Firm*—Myers Bigels Sibley & Sajovec

[57] ABSTRACT

A pixel in IPS LCDs according to the embodiments of the present invention is symmetrical with respect to a data line and a gate line. The data line longitudinally passes through the center of the pixel, and the gate line transversely passes through the center of the pixel. A pixel is confined to an area enclosed by two adjacent transverse common electrode lines and four longitudinal common electrodes which are branches of the common electrode lines. Among the four common electrodes, two are connected to one of the two common electrode lines, and the other two are connected to the other of the common electrode lines. Each pixel has two longitudinal common electrodes overlapped with the data line, four longitudinal pixel electrodes arranged between the common electrodes, and two two-channel TFTs. Each pixel further has two storage electrodes overlapped with the pixel electrodes and electrically connected to the gate line. The storage electrode and the pixel electrode together form a storage capacitor.

29 Claims, 19 Drawing Sheets

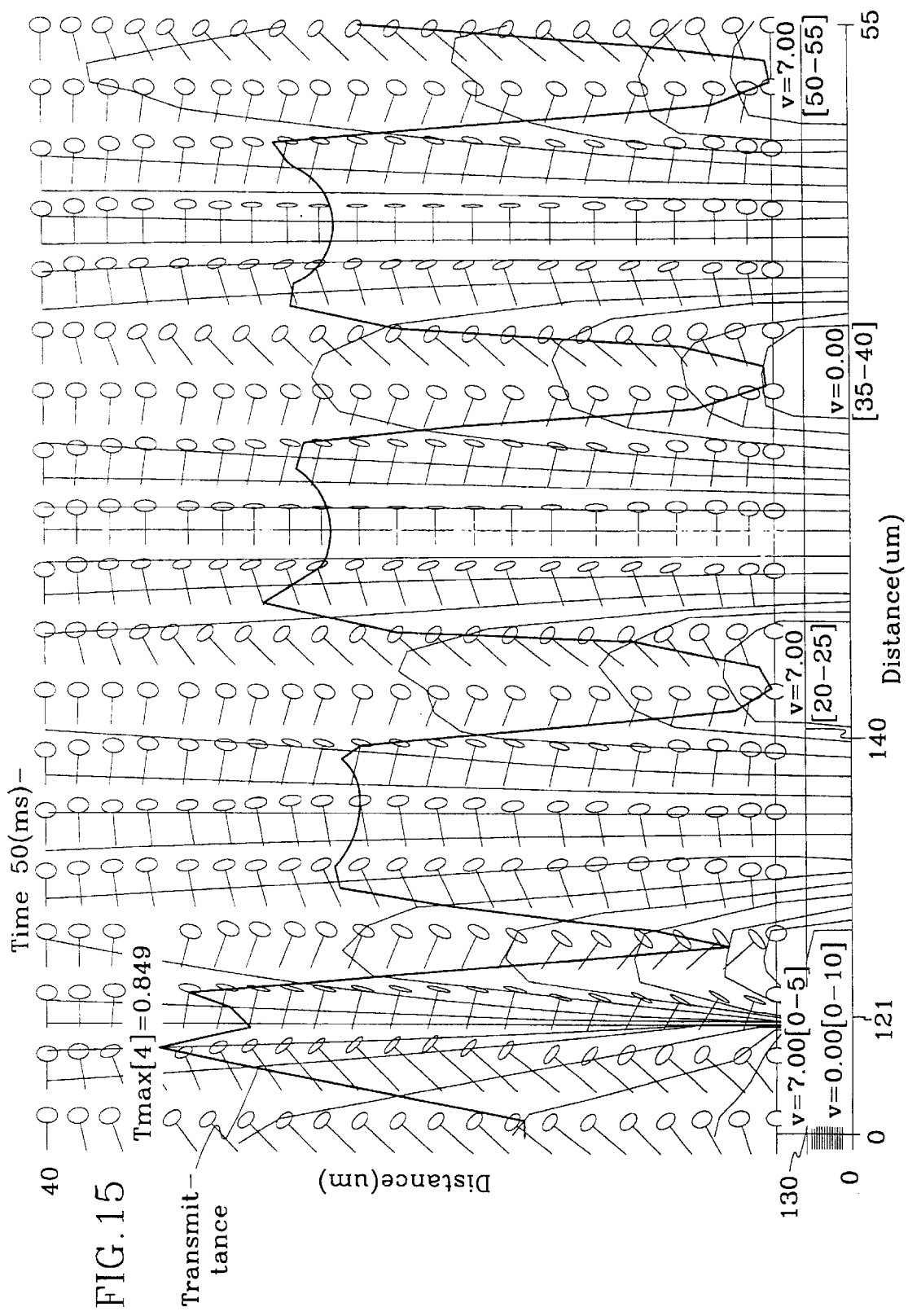

IN-PLANE SWITCHING LIQUID CRYSTAL DISPLAY AND A MANUFACTURING METHOD THEREOF

BACKGROUND OF THE INVENTION

1. Field of the Invention

The present invention relates to a liquid crystal display (hereinafter referred to as an LCD), in particular to an in-plane switching (hereinafter referred to as an IPS) LCD and a manufacturing method thereof.

2. Description of the Related Art

Liquid crystal displays are one of the most highlighted flat panel displays, which use electro-optical properties of liquid crystal materials. In view of driving method, the LCDs are classified into simple matrix type and active matrix type.

An active matrix type LCD has a plurality of switching elements having non-linear characteristics, and pixels of the LCD are controlled by the switching elements. Examples of the switching elements are three-terminal thin film transistors (hereinafter referred to as TFTs) and two-terminal thin film diodes such as metal-insulator-metal (MIM) devices.

A commonly used TFT LCD is comprised of a substrate having pixel electrodes, an opposite substrate having a common electrode, and a liquid crystal material therebetween. When the pixel electrodes and the common electrode are applied with voltages, the molecules of the liquid crystal material change their orientations in response to the electric field due to the potential difference between the pixel electrode and the common electrode. Furthermore, a twisted-nematic (herein after referred to as a TN) mode where the molecular director of the liquid crystal is twisted on going from one substrate to the other substrate is generally used.

However, the LCD, in particular the TN LCD, has a narrow viewing angle and a contrast dependent on the viewing angle. In addition, it has a problem that the number of the process steps are too many since the electrodes are formed in each substrate and the two substrates have a short point for applying voltages into the common electrode.

In order to overcome these problems, IPS LCDs are suggested.

An IPS LCD has pixel and common electrodes formed in only one of the two substrates, and the voltage difference of the pixel electrodes and the common electrode produces substantially horizontal electric fields. One of the IPS LCDs is disclosed in European patent application No. 93307154.0.

Now, conventional IPS LCDs are described with reference to attached figures.

FIG. 1 and 2 are layout views of IPS LCDs disclosed in the paper entitled "Development of Super-TFT-LCDs with In-Plane Switching Display Mode" (M. Ohta et al.) of ASIA DISPLAY '95 pp. 707–710.

Fist, an LCD shown in FIG. 1 is described.

A gate line 1 is formed on a glass substrate (not shown) in a transverse direction, and a data line 11 crossing the gate line 1 is formed in a longitudinal direction. A common electrode line 2 made of the same material as the gate line 1 is arranged so as to be parallel to the gate line 1. A longitudinal branch 3 of the common electrode line 2 goes towards the gate line 1 from the common line electrode 2, and its transverse branch 4 connected to the end of the longitudinal branch 3 is arranged so as to be parallel to the gate line 1. Near the cross point of the gate line 1 and the data line 11, a TFT is formed. A gate electrode 5 and a source electrode 13 of the TFT are a portion of the gate line 1 and of the data line 11, respectively, and a drain electrode 12 of the TFT is opposite the source electrode 13. The drain electrode 12 is made of the same material as the data line 11, and there is a semiconductor layer 20 between the gate electrode 5 and the source and the drain electrodes 13 and 12. The drain electrode 12 extends to form a pixel electrode 16, 17, 18 and 19. The pixel electrode 16 has a rectangular shape having two longitudinal sides 16 and 17 and two transverse sides 18 and 19. The transverse sides 18 and 19 are overlapped with the common electrode line 2 and its transverse branch 4, respectively. These overlapped structures function as storage capacitors. The longitudinal branch 3 of the common electrode line 2 is arranged between the two longitudinal sides 16 and 17 of the pixel electrode, and the potential difference between the longitudinal sides 16 and 17 and the longitudinal branch controls performance of the liquid crystal molecules.

Next, an LCD shown in FIG. 2 is described, where the shape of the branches of the common electrode line is replaced with the shape of a pixel electrode in comparison with the LCD shown in FIG. 1.

A common electrode line 2 has two longitudinal branches 6 and 7 and one transverse branch 8 connecting the longitudinal branches 6 and 7, and thus the common electrode line 2 along with its branches 6, 7 and 8 forms a rectangle. On the other hand, a pixel electrode 13, 14 and 15 extended from a drain electrode 12 is comprised of two transverse portions 14 and 15 and a longitudinal portion 13 connecting the midpoints of the transverse portions 14 and 15. The transverse portions 14 and 15 are overlapped with the common electrode line 2 and its transverse branch 8, and these overlapped structures serve as storage capacitors. The longitudinal portion 13 is arranged between the two longitudinal branches 6 and 7 of the common electrode line 2, and the potential difference between the longitudinal branches 16 and 17 and the longitudinal portion 13 adjusts performance of the liquid crystal molecules.

It is disclosed in the above-described paper that these LCDs have improved viewing characteristics.

However, the paper lodges some issues.

First, the liquid crystal molecules should be shielded from the electric fields produced from the data line.

The longitudinal side 16 of the pixel electrode shown in FIG. 1 and the longitudinal branch 6 of the common electrode shown in FIG. 2, both adjacent to the data line 11, serve as shields from the electric field of the data line 11. Since the pixel electrode is floated when the TFT is in off state, its potential is easily disturbed by the potential of outside. On the other hand, the common electrode line and its branches are not easily disturbed since they are constantly applied with voltages.

Accordingly, the LCD shown in FIG. 2 effectively shields the electric fields from the data line.

Second, aperture ratio should be considered since all the electrodes are formed in a substrate.

The aperture ratio is determined by the effective display area, that is, the area surrounded by the pixel electrodes 16, 17, 18 and 19 shown in FIG. 1 or the area enclosed by the common electrode line 2 and its branches 6, 7 and 8 shown in FIG. 2. In case of the LCD shown in FIG. 1, the longitudinal side 16 of the pixel electrode adjacent to the data line 11 should be separated from the data line 11 by predetermined distance in order to prevent their short-circuiting since the pixel electrode 16, 17, 18 and 19 and the data line 11 are made of the same layer. On the other hand, concerning the LCD shown in FIG. 2, since the common electrode line 2 and its branches 6, 7 and 8 are insulated from the data line 11 via an insulating layer (not shown), it is permissible that they become considerably closer.

Therefore, the LCD shown in FIG. 2 is effective to obtain large aperture ratio.

However, these conventional IPS LCDs have a disadvantage that they cannot sufficiently shield the electric fields from the data line. Further, there are disadvantages that the capacitance of a parasitic capacitor comprised of a gate and a source of a TFT is not uniform between pixels when misalign occurs, and the on current of the TFT is low.

SUMMARY OF THE INVENTION

An object of the present invention is to shield an electric field of a data line effectively in an IPS LCD. Another object of the present invention is to provide TFTs having high on currents. Another objects of the present invention are to increase aperture ratio and to obtain uniform parasitic capacitance pixel by pixel.

In order to achieve these objects, an in-plane switching liquid crystal display substrate having a plurality pixels, a gate line and a data line pass through the center of the pixel transversely and longitudinally, respectively. A plurality of common electrodes and pixel electrode are alternately formed in the longitudinal direction and they are symmetrical with respect to the gate line and the data line.

In a liquid crystal display substrate according to the present invention, a plurality of common electrodes and a gate line are formed on the substrate in a first direction and in a second direction, respectively, and a gate insulating layer is formed thereon. A pixel electrode is formed between the common electrodes in the second direction, and a data line connected to the pixel electrode is formed on the gate insulating layer along the common electrode to be overlapped with the gate insulating layer.

It is preferable that the pixel electrode is made of the same material as the data line.

Preferably, the liquid crystal display further includes a three-terminal switching element. A first terminal of the switching element is connected to the gate line, a second terminal to the data line, and a third terminal to the pixel electrode, and thus the connection of the data line and the pixel electrode is via the switching element. An example of the switching element is a two-channel transistor which has two drains respectively connected to pixel electrodes.

Further, the edges of the data line, preferably, lie within the width of the common electrode overlapped with the data line.

The common electrode overlapped with the data line may have an opening at central portion.

The liquid crystal display substrate may further have a storage electrode formed under the gate insulating layer along the pixel electrode to be overlapped with the pixel electrode. The storage electrode is transparent and electrically connected to the gate line.

The liquid crystal display substrate further includes a plurality of common electrode lines connected to the common electrodes.

A liquid crystal display having an above-described first substrate and a second transparent substrate opposite the first substrate is provided according to the present invention. On the second substrate, a homogenously aligned first alignment layer is formed and the rubbing direction of the first alignment layer makes 30–60 degrees with respect to the second direction.

On the first substrate, there may be formed a second alignment layer rubbed in the same direction as the rubbing direction of the first alignment layer.

In order to manufacture the above described liquid crystal display substrate includes the steps of forming a plurality of common electrodes and a storage electrode simultaneously, forming a gate line, a gate insulating layer and a semiconductor layer in sequence, and forming pixel electrodes and a data line either in sequence or simultaneously.

BRIEF DESCRIPTION OF THE DRAWINGS

The preferred embodiment of the present invention will now be described more specifically with reference to the attached drawings, wherein:

FIGS. 14 and 15 are graphs illustrating the transmittance of the LCD in the present invention.

DESCRIPTION OF THE PREFERRED EMBODIMENT

A preferred embodiment of the present invention will become apparent from a study of the following detailed description, when viewed in light of the accompanying drawings.

Figure 3:
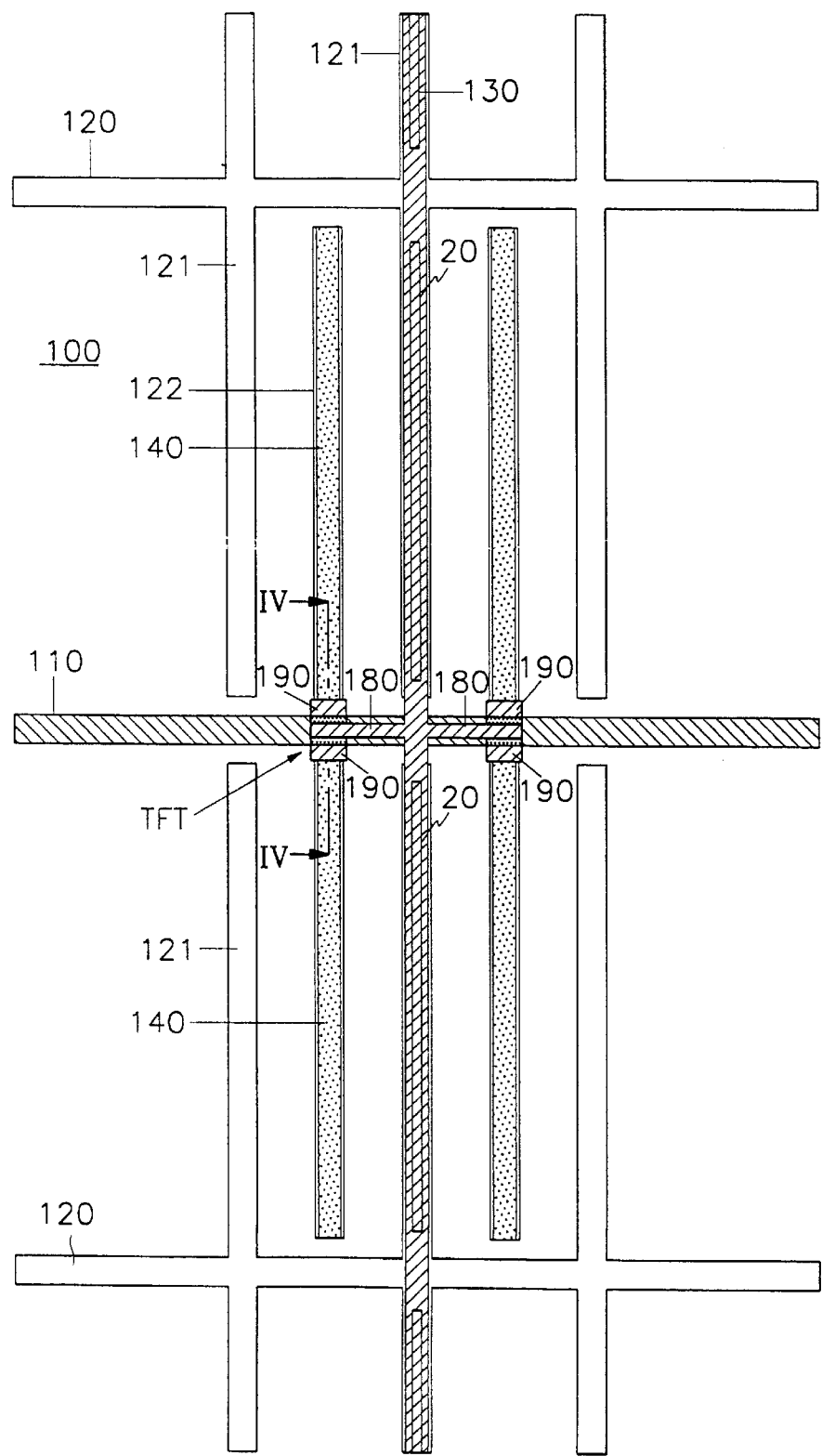
FIG. 3 is a layout view of an IPS LCD according to the first embodiment of the present invention.
Figure 6:
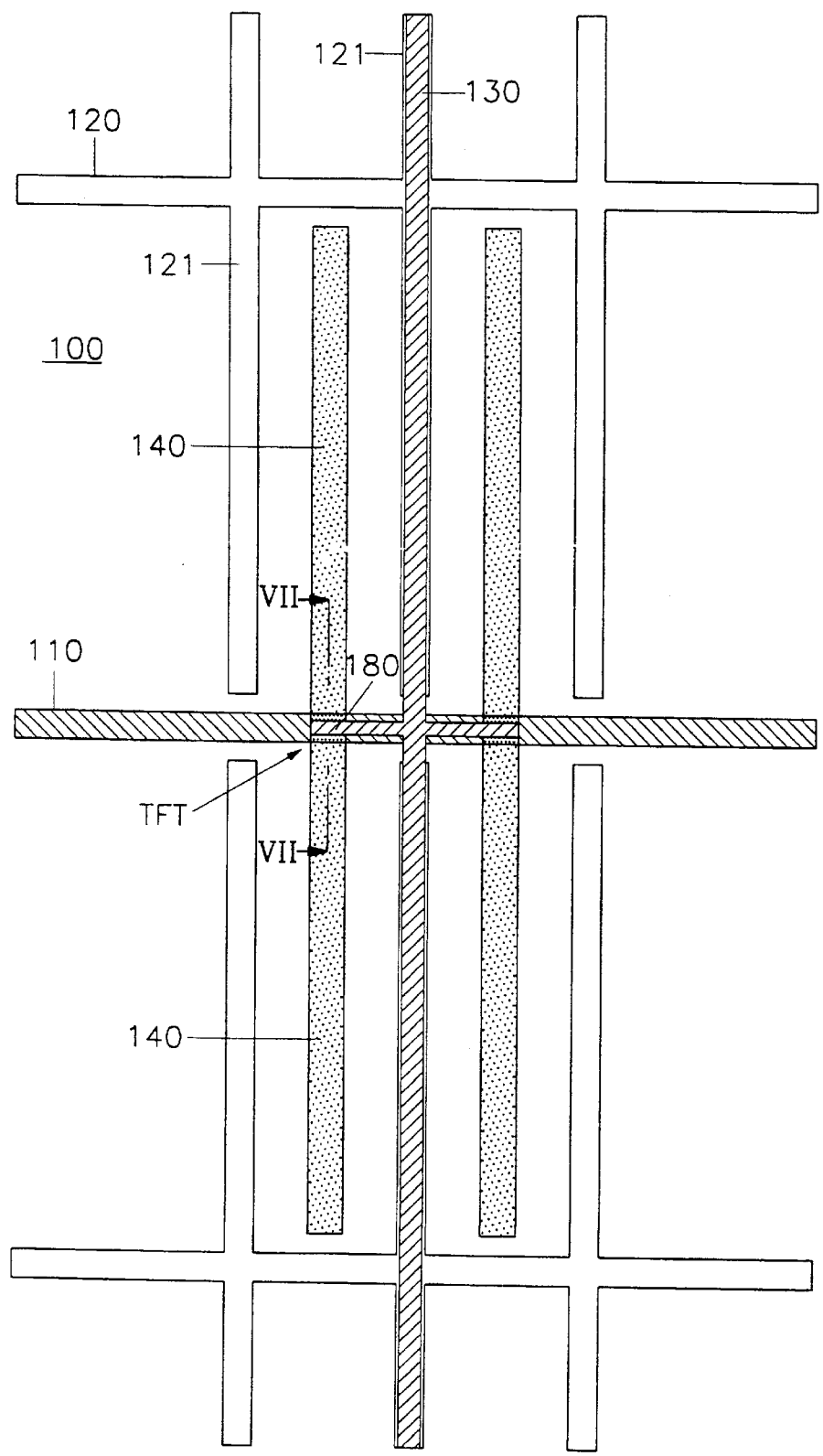
FIG. 6 is a layout view of an IPS LTD according to the second embodiment of the present invention.
Figure 8:
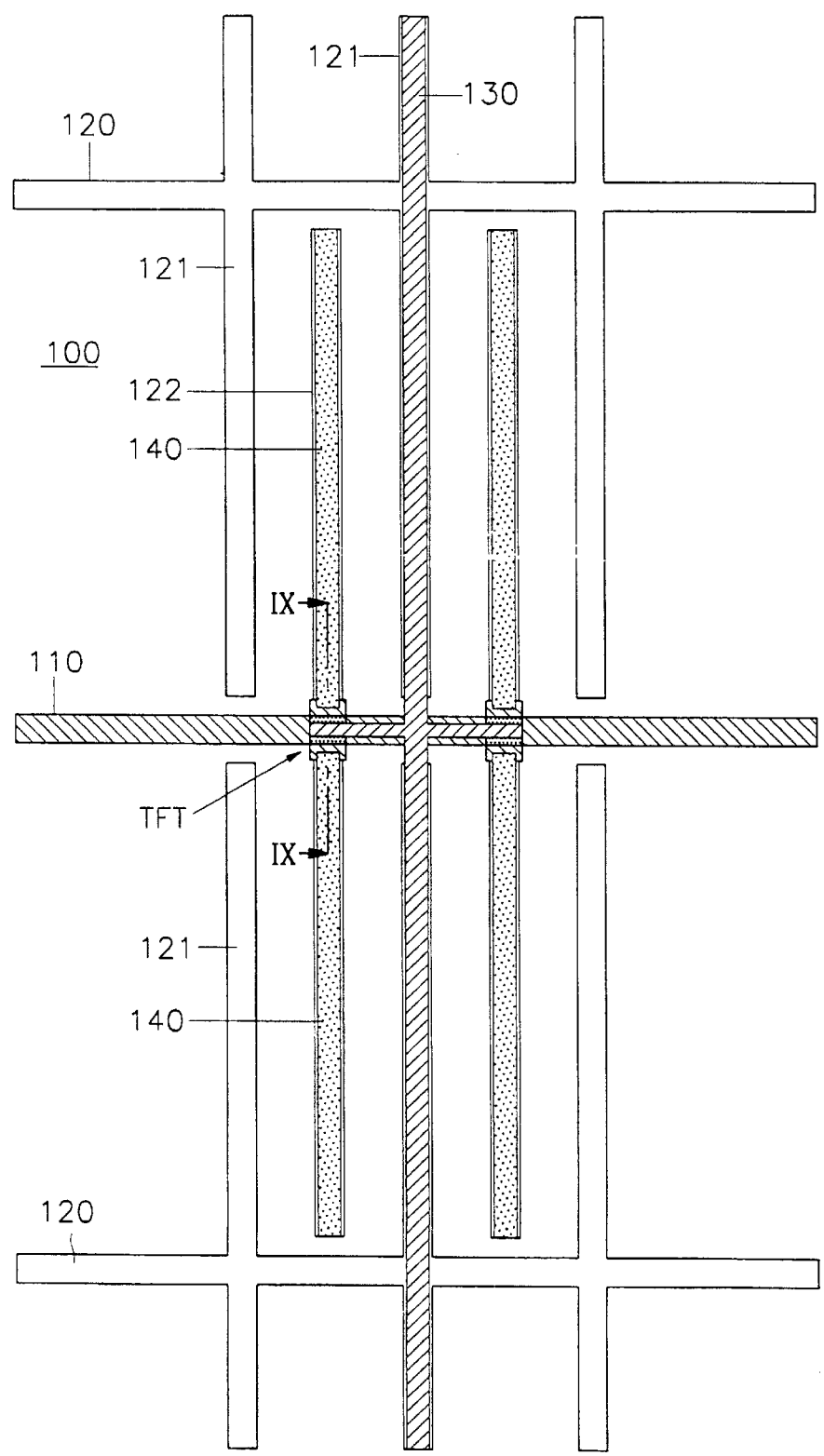
FIG. 8 is a layout view of an IPS LCD according to the third embodiment of the present invention.

As shown in FIG. 3, 6 and 8, a pixel in IPS LCDs according to the embodiments of the present invention is symmetrical with respect to a data line 130 and a gate line 110. The data line 130 longitudinally passes through the center of the pixel, and the gate line 110 transversely passes through the center of the pixel. Further, a pixel is confined to an area enclosed by two adjacent transverse common electrode lines 120 and four longitudinal common electrodes 121 which are branches of the common electrode lines 120. Among the four common electrodes 121, two are connected to one of the two common electrode lines 120, and the other two are connected to the other of the common electrode lines 120. Each pixel has two longitudinal common electrodes 121 overlapped with the data line 130, four longitudinal pixel electrodes 140 arranged between the common electrodes 121, and two two-channel TFTs. Each pixel further has two storage electrodes 122 overlapped with the pixel electrodes 140 and electrically connected to the gate line 110. The storage electrode 122 and the pixel electrode 140 together form a storage capacitor.

Now, an LCD substrate according to the first embodiment of the present invention is described in detail with reference to FIGS. 3 to 5E.

As shown in FIG. 3, common electrode lines 120 are formed on the glass substrate 100 in the transverse direction. Longitudinal branches 121 of the common electrode line 120 are symmetrically extended from the common electrode line 120 upwards and downwards to form common electrodes 121. The common electrodes 121 are arranged in columns, and the branches of one common electrode line 120 does not meet the branches of the adjacent common electrode lines 120.

Storage electrodes 122 are formed on the substrate between the common electrodes 121 in the longitudinal direction. The storage electrodes 122 do not meet the common electrode lines 120 and they may be abbreviated.

The common electrode lines 120, the common electrodes 121, and the storage electrodes 122 are made of a transparent conductive material such as ITO (indium-tin-oxide).

In the space between the branches of one common electrode line 120 and those of the adjacent common electrode lines 120, there is formed a gate line 110 in the transverse direction, with being separated from the branches of the common electrodes 121. The gate line 110 is made of chromium and it crosses the storage electrodes 122 to be electrically connected to the storage electrodes 122.

Figure 4:
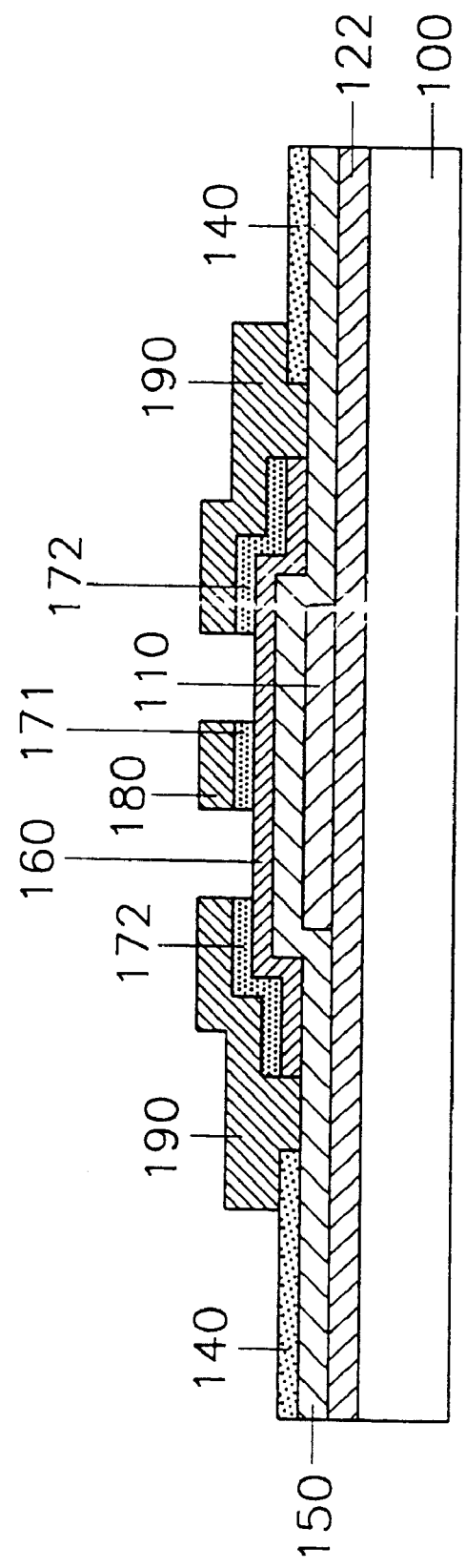
FIG. 4 is a sectional view cut along the line IV—IV in FIG. 3.

A gate insulating layer 150 made of silicon nitride is formed on the common electrode lines 120, the common electrodes 121, the storage electrodes 122 and the gate line 110 as shown in FIG. 4.

Pixel electrodes 140 are formed on the gate insulating layer 150 along the storage electrodes 122, and they are symmetrically arranged with respect to the gate line 110.

As shown in FIG. 4, a semiconductor layer such as an amorphous silicon layer 160 is formed on the gate insulating layer 150 at the cross point of the storage electrode 122 and the gate line 110, and a contact layer 171 and 172 made of n+ amorphous silicon is formed thereon. Since the TFT in this embodiment has a two-channel structure, the contact layer has a central portion 171 and end portions 172 separated from one another.

A data line 130 is formed on the gate insulating layer 150 in the longitudinal direction. The data line 130 is fully overlapped with the common electrodes 121 in a column, and the edges of the data line lie within the width of the common electrodes 121.

The common electrode 121 overlapped with the data line 130 have openings 20 in order to prevent the signal flowing along the data line 130 from disturbing by the signal from the common electrodes 121.

Since the data line 130 is formed on the common electrodes 121, the electric fields due to the potential difference between the data line 130 and the common electrodes 121 are vertical. Therefore, the fields rarely disturb the liquid crystal molecules, in particular, in case of the width of the common electrode 121 is larger than that of the data line 130.

Transverse branches 180 of the data line 130 is extended from the cross point of the data line 130 and the gate line 110 along the gate line 110. The end portions of the branches 180 of the data line 130 formed on the central portion 171 of the contact form source electrodes 180 of the TFTs, and drain electrodes 190 are formed on the end portions 172 of the contact layer. Each drain electrode 190 is connected to a pixel electrode 140. A gate electrode of the TFT is a portion of the gate line 110.

When this two-channel TFT is used, high on current is obtained.

As described above, a pixel is symmetrical with respect to the gate line 110 and the data line 130. Further, the gate line 110 and the data line 120 cross at the center of the pixel. Therefore, a longitudinal misalignment cannot affect the capacitance of a parasitic capacitor consisting of the gate electrode 110 and either the source electrode 180 or the drain electrode 190 since the overlapped area between them is constant. As a result, the parasitic capacitances are uniform pixel by pixel.

Figure 1:
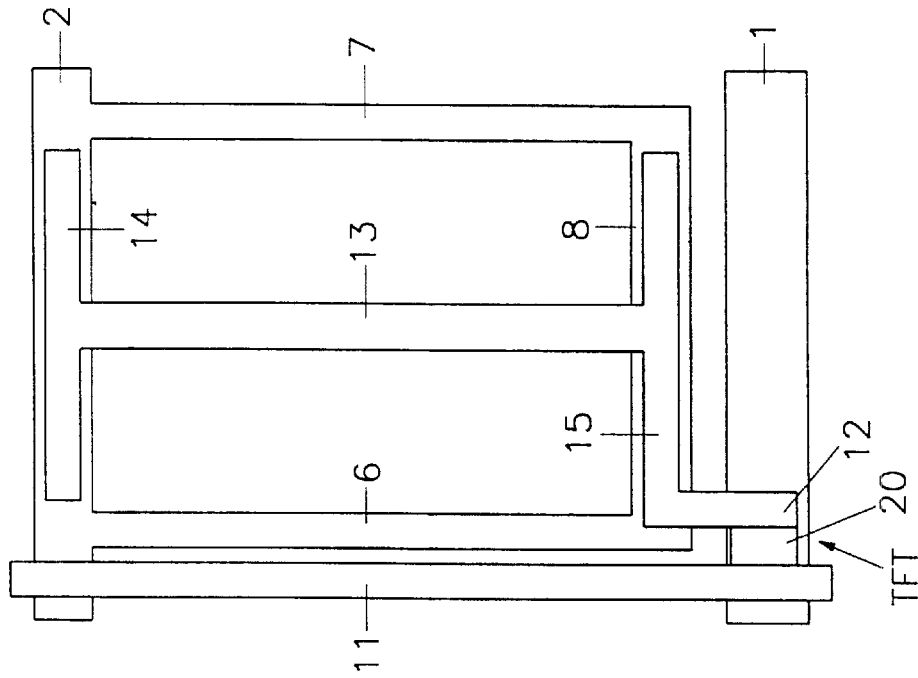
FIGS. 1 and 2 are layout views of conventional IPS LCDs.
Figure 2:
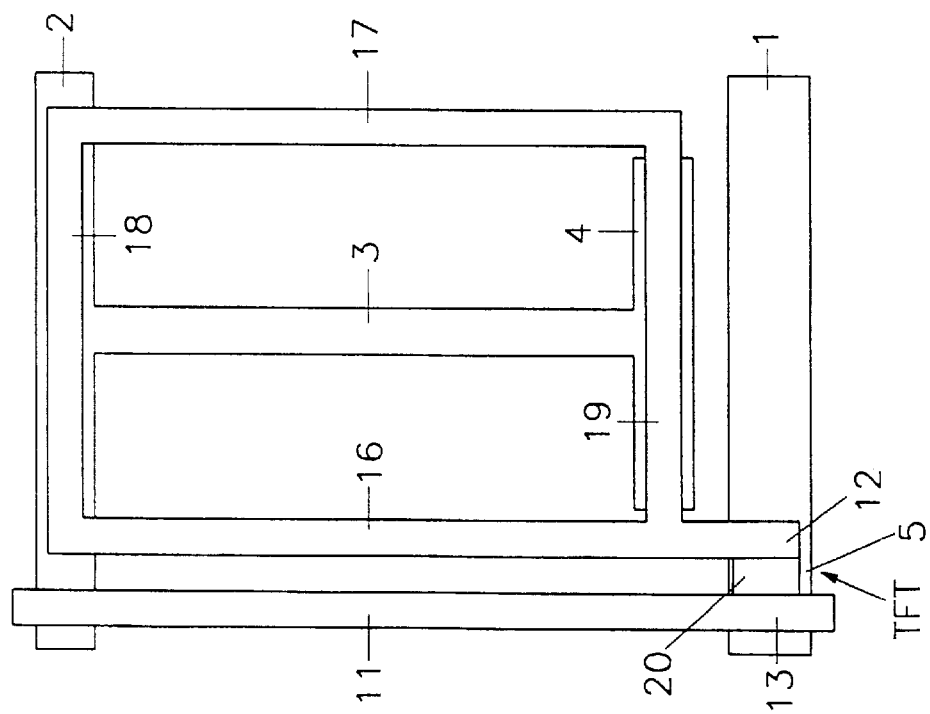

In addition, the common electrode lines 120, the common electrodes 121, the pixel electrodes 140 and the storage electrodes 122 are made of transparent ITO, and the structure is simple. Accordingly, the aperture ratio of the IPS LCDs according to this embodiment is higher than that of the IPS LCDs shown in FIGS. 1 and 2.

Now, a method for manufacturing the above described LCD is described with reference to FIGS. 5A to 5E. It is noted that the opening a in FIG. 3 is omitted.

Figure 5A:
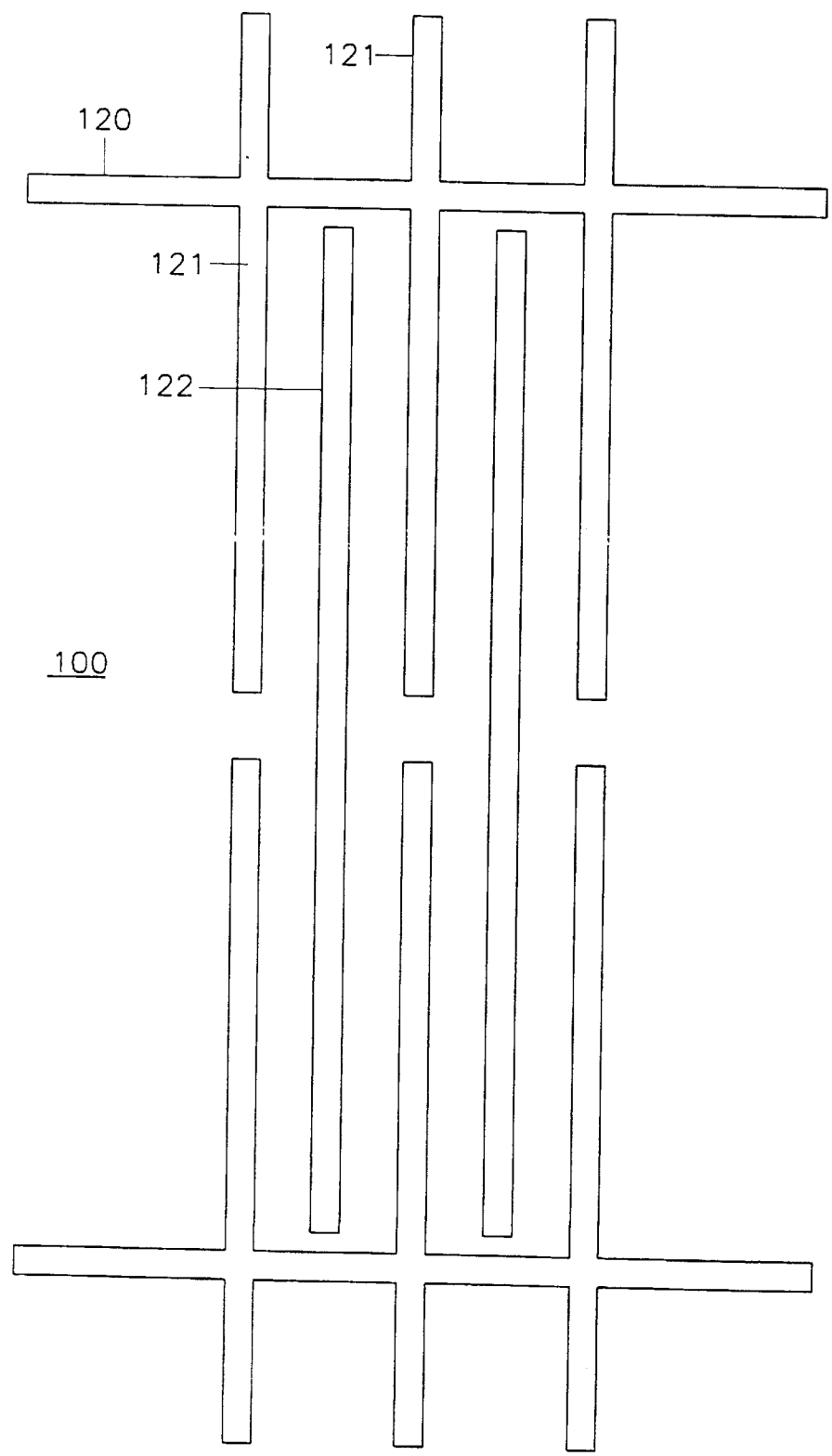
FIGS. 5A to 5E are layout views illustrating a manufacturing method of the IPS LCD shown in FIG. 3.

As shown in FIG. 5A, a transparent conductive material such as ITO is deposited and patterned to form common electrode lines 120, common electrodes 121 and storage electrodes 122.

Figure 5B:
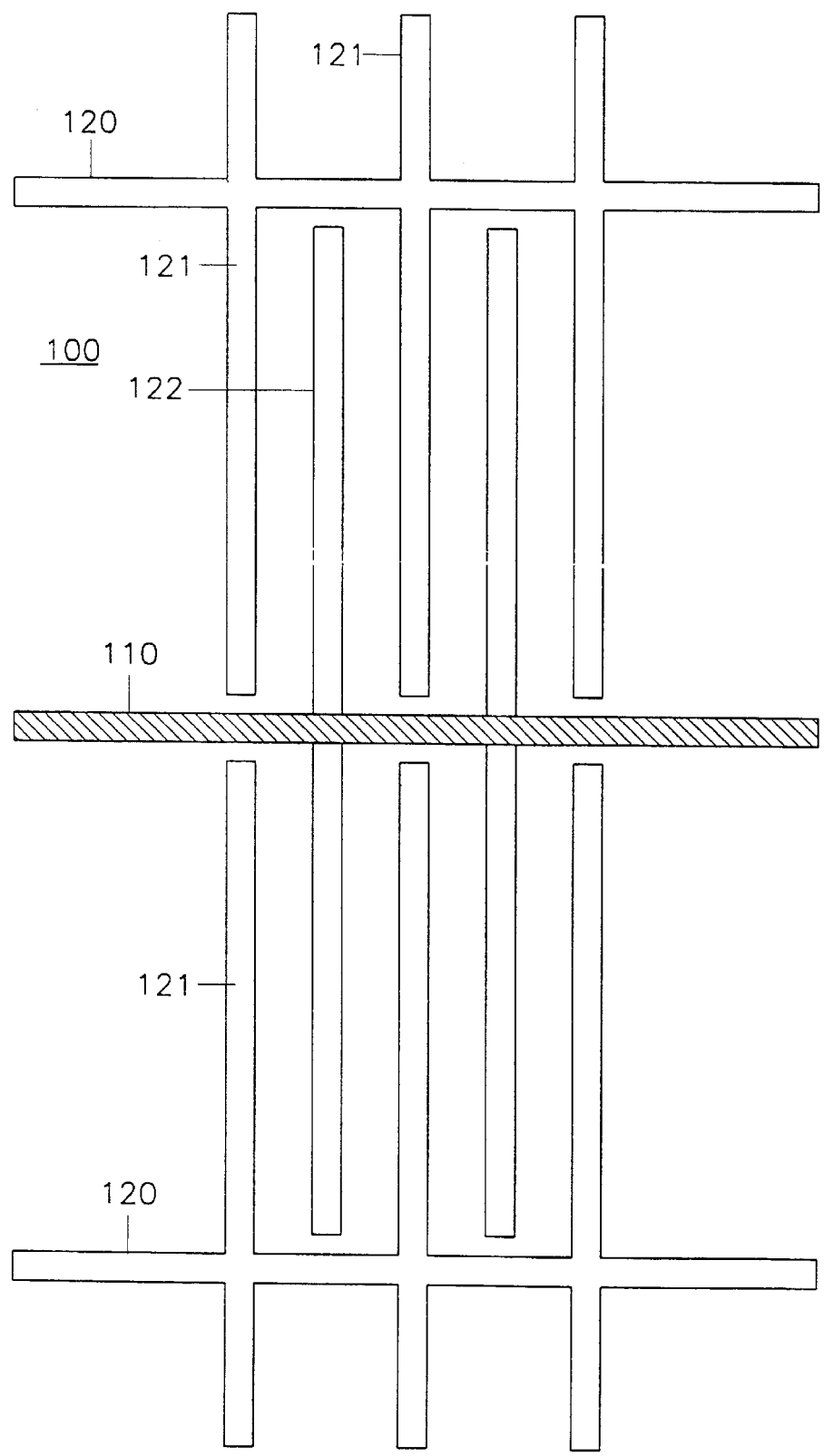

As shown in FIG. 5B, a conductive material such as chromium is deposited and patterned to form a gate line 110 arranged in the transverse direction. The gate line 110 meets the storage capacitors 122 formed in longitudinal direction.

Figure 5C:
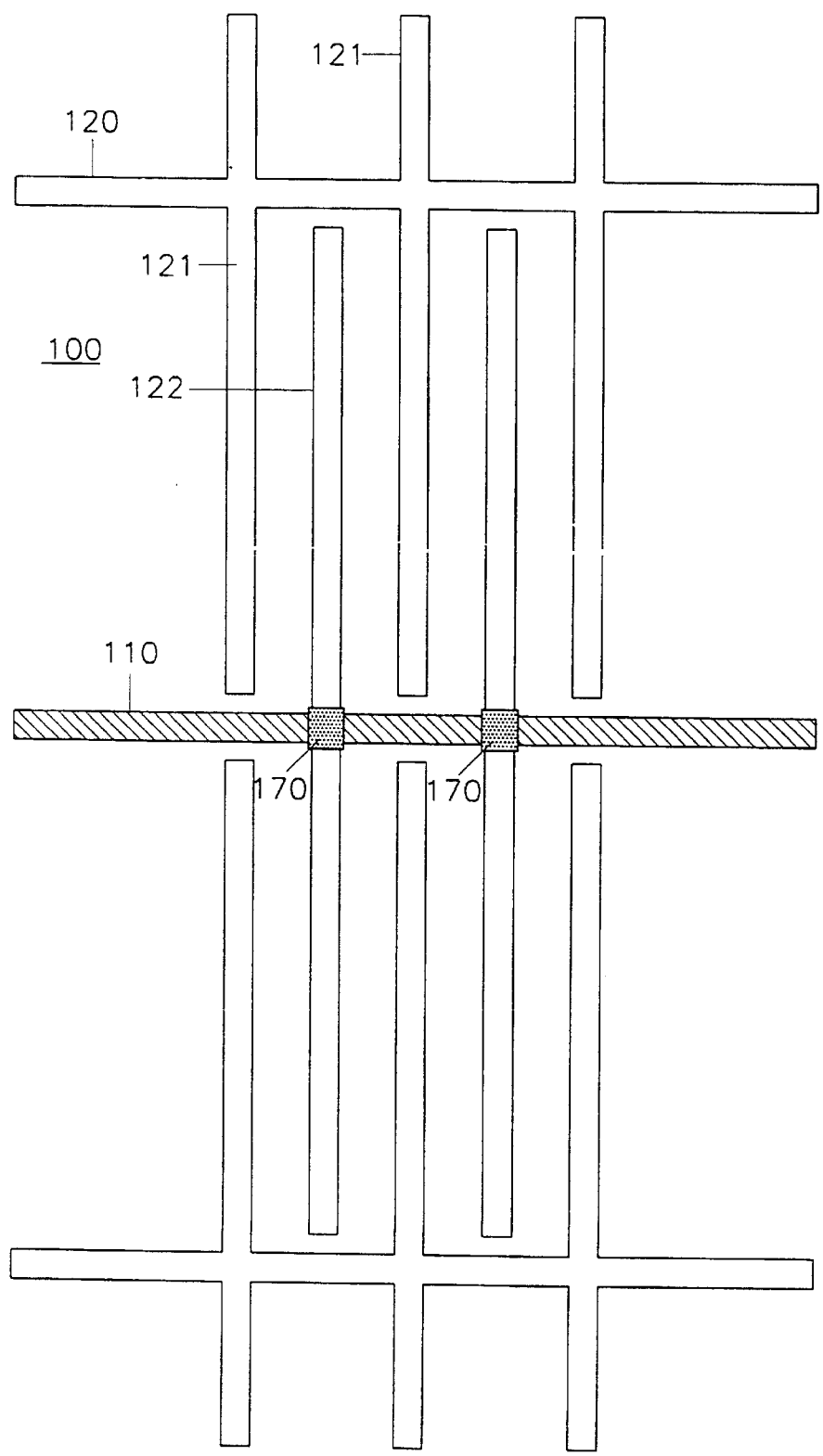

As shown in FIG. 5C, a silicon nitride layer, an amorphous silicon layer and an n+ amorphous silicon layer are deposited, and the upper two layers are patterned to form a semiconductor pattern 170 consisting of the amorphous silicon layer and the n+ amorphous silicon layer at the cross points of the gate line 110 and the storage electrodes 122 (see FIG. 3).

Figure 5D:
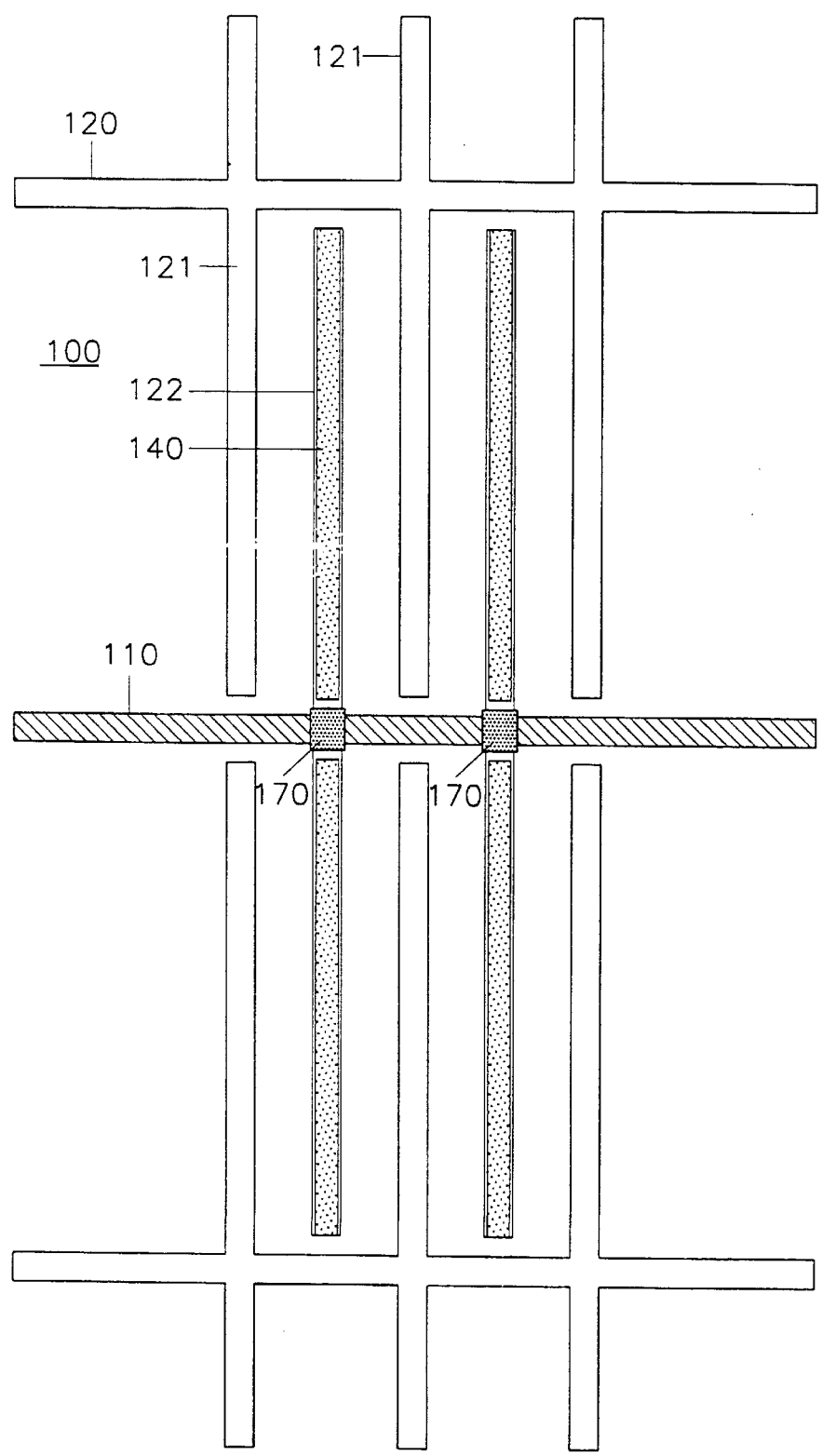

As shown in FIG. 5D, a transparent conductive material such as ITO is deposited and patterned to form pixel electrodes 140 along the storage electrodes 122. The pixel electrodes 140 are symmetrical with respect to the semiconductor pattern 170.

Figure 5E:
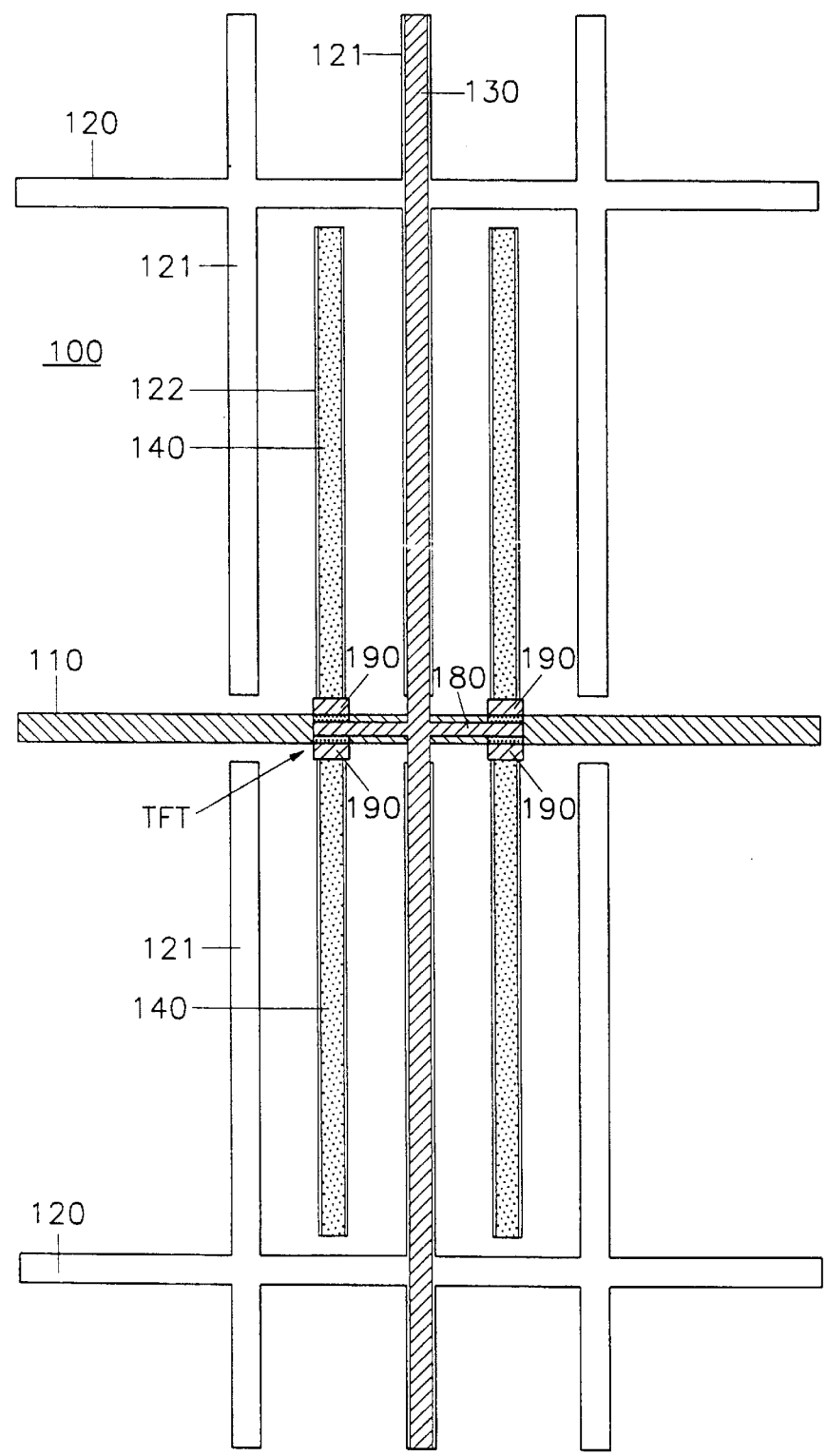

As shown in FIG. 5E, a conductive material such as chromium is deposited and patterned to form a data line 130, source electrodes 180 and drain electrodes 190. Then, the n+ amorphous silicon layer is etched to form a contact layer 71 and 72 by using the source and the drain electrodes 180 and 190 as a mask.

Finally, a passivation layer (not shown) is formed on the whole surface of the substrate.

Next, an IPS LCD according to the second embodiment of the present invention is described.

Figure 7:
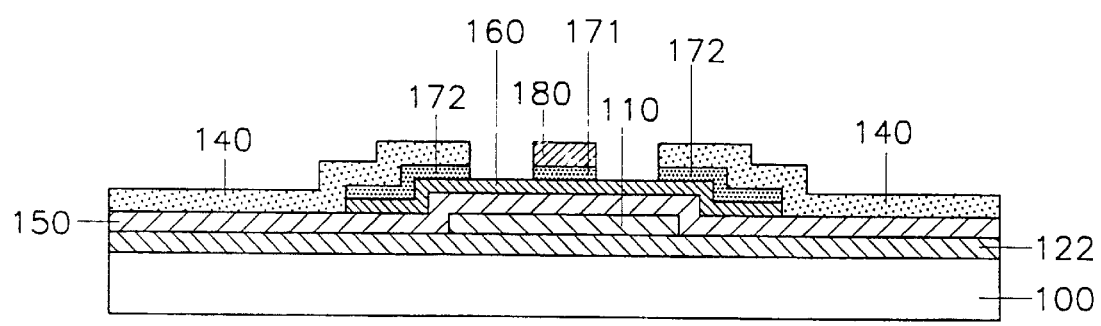
FIG. 7 is a sectional view cut along the line VII—VII in FIG. 6.

As shown in FIG. 7, the LCD of this embodiment is different from that of the first embodiment in that pixel electrodes 140 are made of the same material as a data line 130 and thus drain electrodes are parts of the pixel electrode 140. FIG. 8 shows that the pixel electrode 140 is on the same layer as the source electrode 180.

In order to manufacture the LCD shown in FIGS. 6 and 7, after the steps shown in FIGS. 5A to 5C are performed, a conductive material such as chromium is deposited and patterned to form a data line 130, source electrodes 180 and pixel electrodes 140. Then, the n+ amorphous silicon layer is etched to form a contact layer 71 and 72 by using the source and the pixel electrodes 180 and 140 as a mask and a passivation layer (not shown) is formed on the whole surface of the substrate.

Finally, an IPS LCD according to the third embodiment of the present invention.

Figure 9:
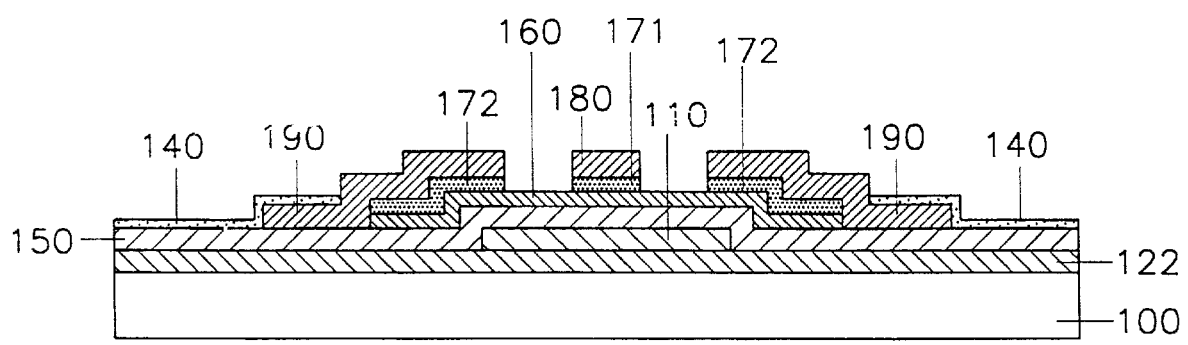
FIG. 9 is a sectional view cut along the line IX—IX in FIG. 8.

As shown in FIG. 8 and 9, the LCD of this embodiment is different from that of the first embodiment in that pixel electrodes 140 lie over drain electrodes 190.

Figure 10A:
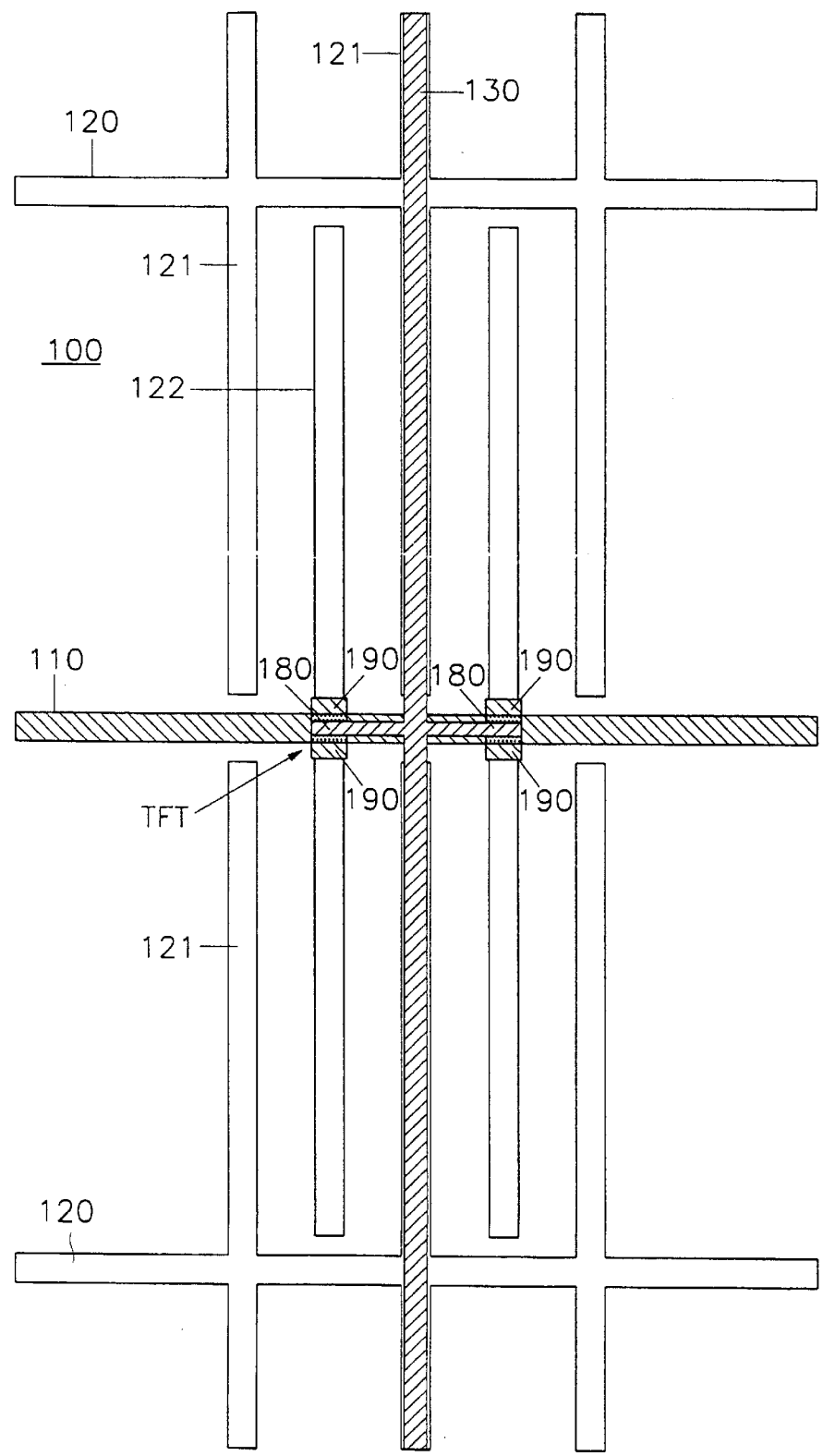
FIGS. 10A and 10B are layout views illustrating a manufacturing method of the IPS LCD shown in FIG. 8.

In order to manufacture the LCD shown in FIGS. 8 and 9, after the steps shown in FIGS. 5A to 5C are performed, a conductive material such as chromium is deposited and patterned to form a data line 130, source electrodes 180 and drain electrodes 190 as shown in FIG. 10A. Then, the n+ amorphous silicon layer is etched to form a contact layer 71 and 72 by using the source and the drain electrodes 180 and 190 as a mask.

Figure 10B:
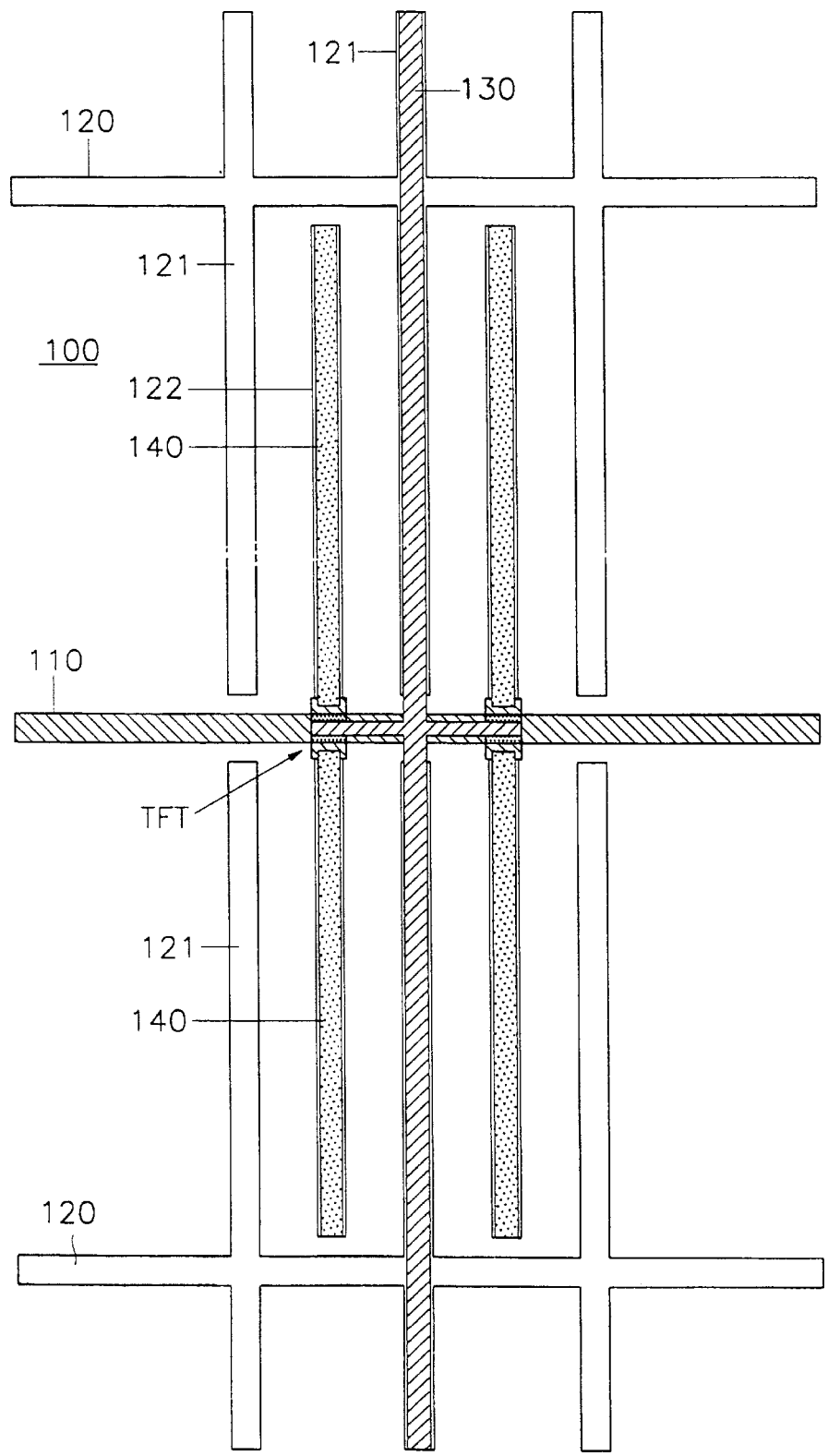

As shown in FIG. 10B, a transparent conductive material such as ITO is deposited and patterned to form pixel electrodes 140 along the storage electrodes 122. The pixel electrodes 140 are symmetrical with respect to a TFT and they are in contact with the drain electrodes 190. Finally, a passivation layer (not shown) is formed on the whole surface of the substrate.

It is assumed that one substrate where electrodes are formed as shown in FIGS. 3, 6 and 9 is a first substrate 100 and the other substrate is a second substrate 500.

Figure 11:
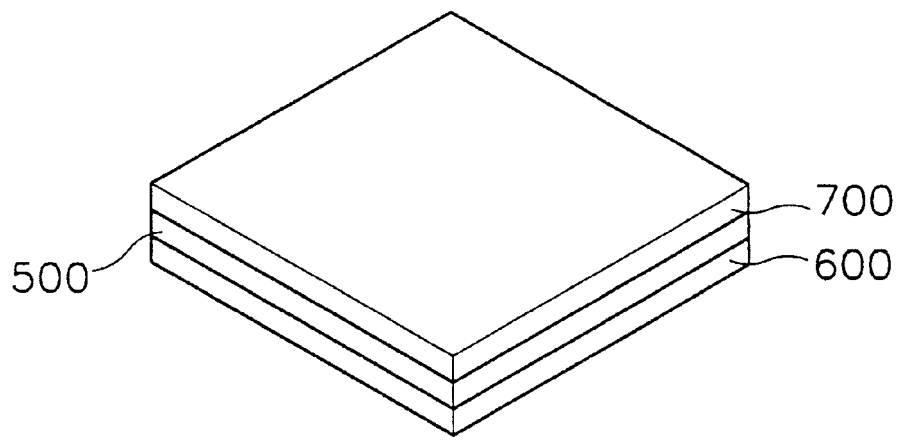
FIG. 11 shows a perspective view illustrating a manufacturing method of and LCD according to the present invention.
Figure 11:
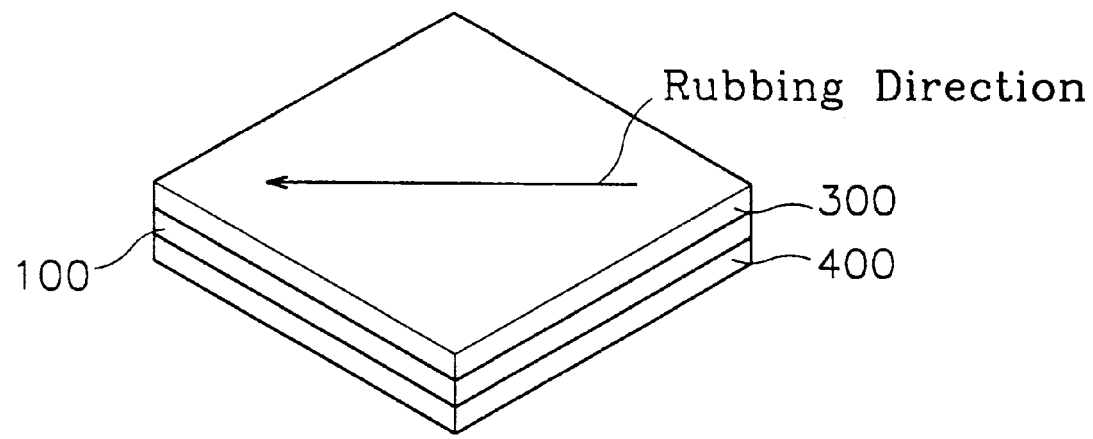

As shown in FIG. 11, the two substrates 100 and 500 are coated with alignment layers 300 and 600, and the alignment layers 300 and 600 are rubbed in a direction making 45 degrees with respect to the pixel electrodes 140 or the common electrodes 121 of the first substrate 100. The substrates 100 and 500 are assembled and sealed. A pure liquid crystal material having a positive dielectric anisotropy is inserted between the two substrates 100 and 500. Then, a polarizer 400 and an analyzer 700 are attached to the respective substrate 100 and 500 so that the polarization axis of one of the polarizer 400 or the analyzer 700 is parallel to the rubbing direction and the polarization axes of the polarizer 400 and the analyzer 700 cross each other.

The performance of the liquid crystal molecules of the LCD manufactured as described above is now described with reference to FIGS. 12 and 13.

Figure 12:
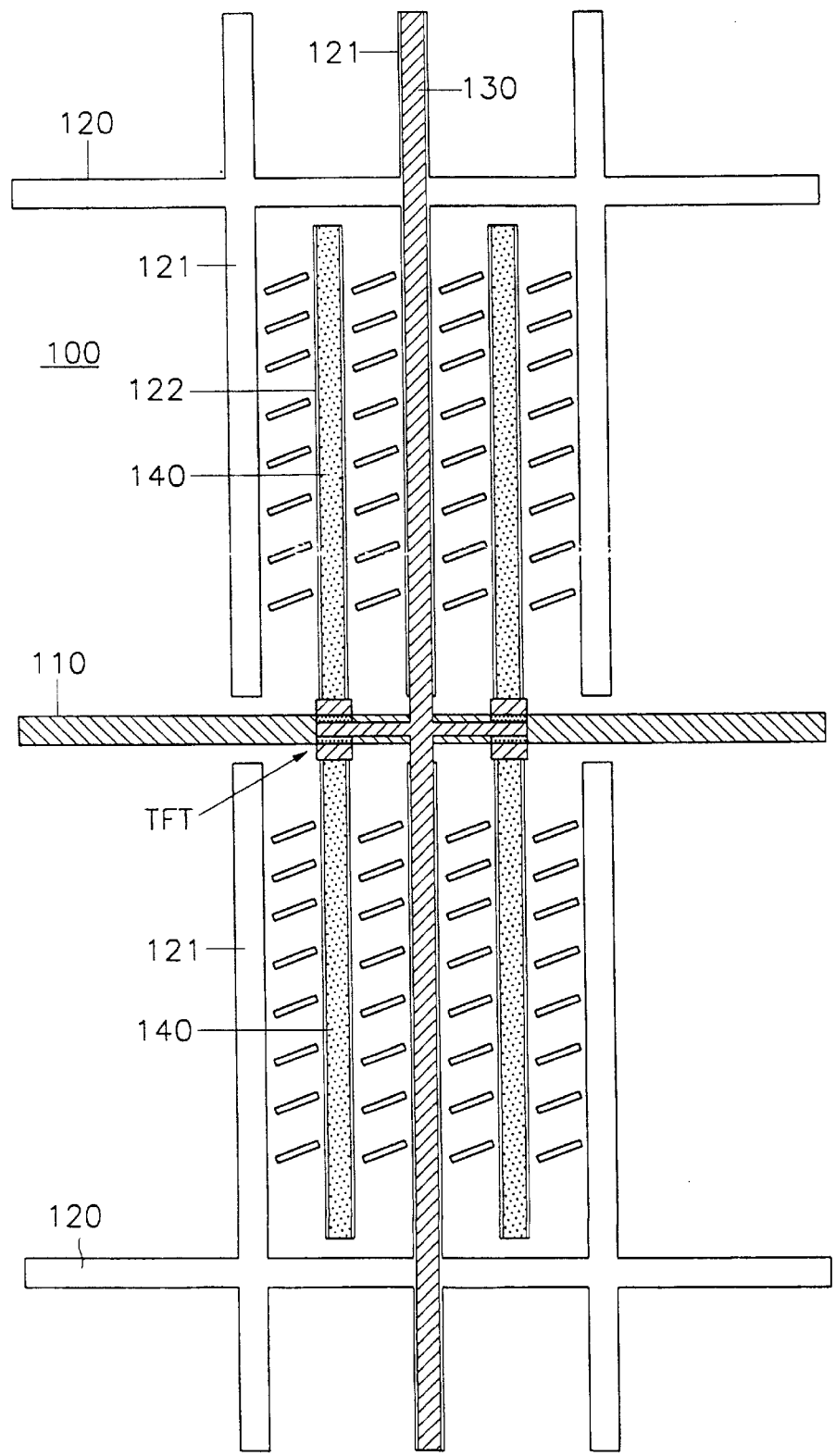
FIGS. 12 and 13 are diagrams showing the performance of the liquid crystal molecules in the present invention.

As shown in FIG. 12, when no electric fields are produced between the electrodes 121 and 140, the molecules of the liquid crystal material remains their initial orientations, i.e., the molecular axes remains to make 45 degrees with respect to the pixel electrodes 140.

Figure 13:
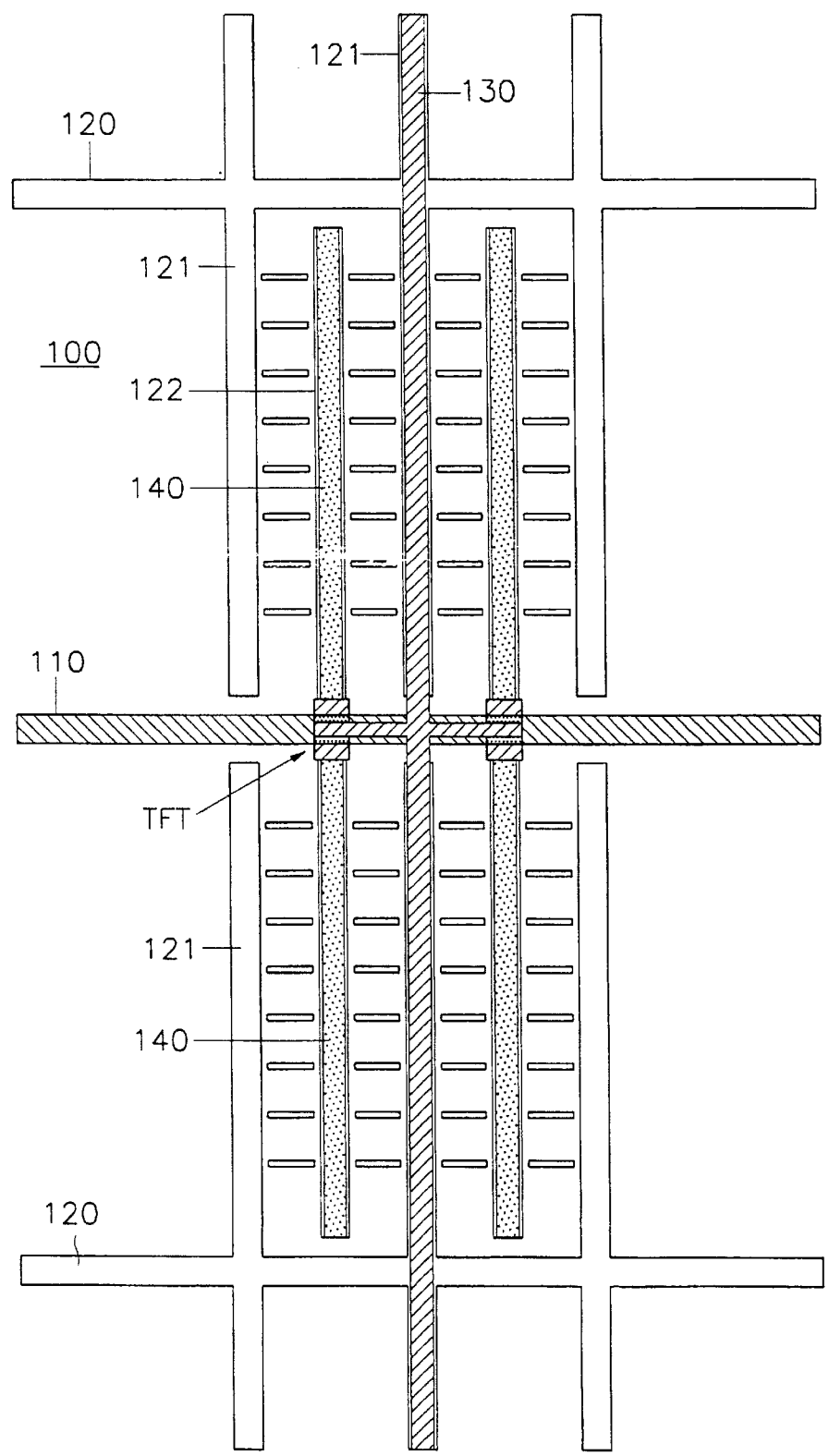

When an electric fields due to the potential difference between the pixel electrodes 140 and the common electrodes 121 is produced, the orientations of the liquid crystal molecules becomes to vary. As shown in FIG. 13, the molecular axes except near the surface of the substrates tend to align along the field direction, and if the field strength is sufficiently high, the molecular axes in the mid-region orients along the field direction.

Figure 14:
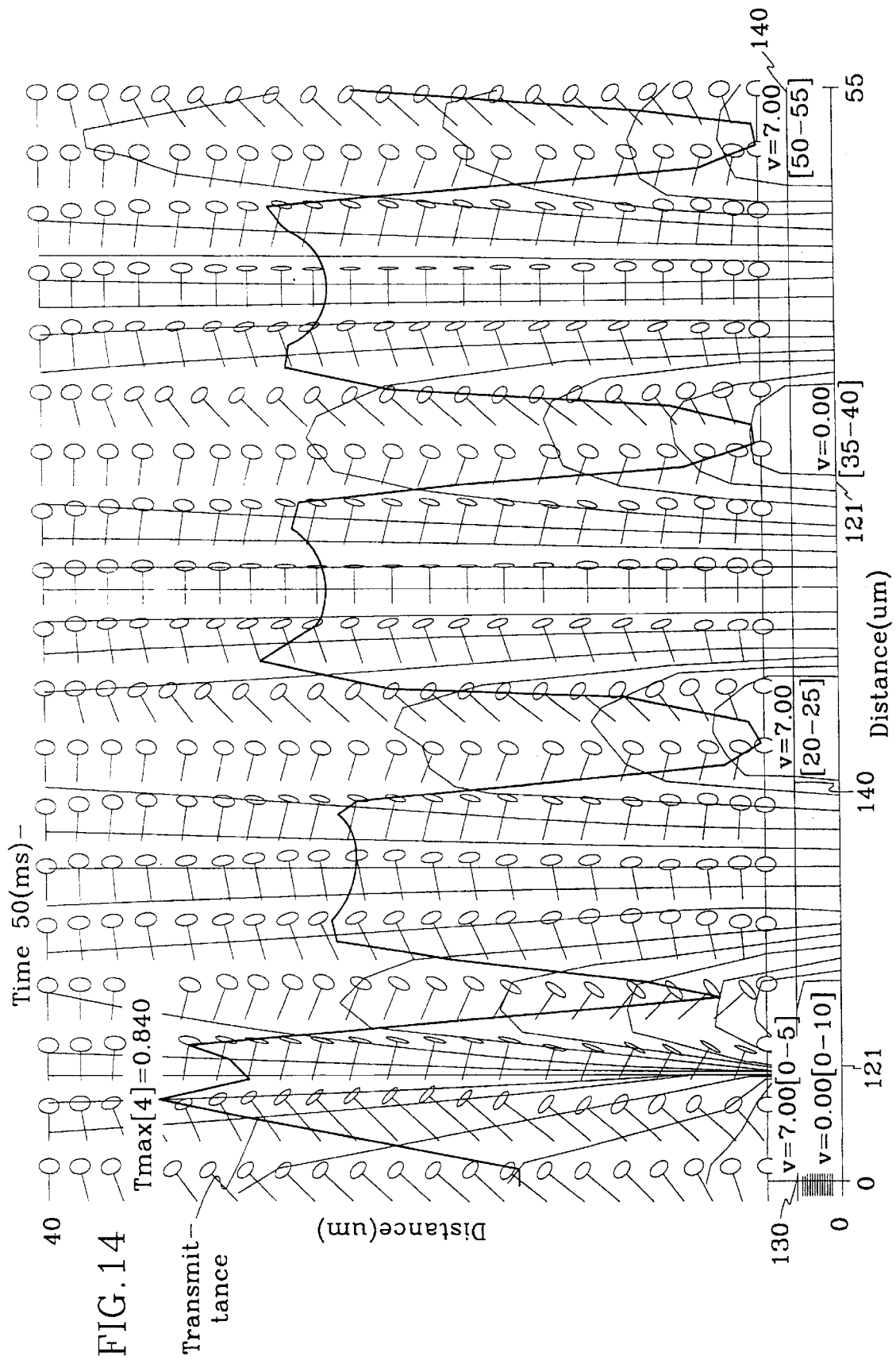

The transmittance of the LCD according to the present invention is shown in FIG. 14 and 15. Here, FIG. 14 corresponds to the case that the polarization axis of a polarizer attached on the first substrate having electrodes is parallel to the rubbing direction, and FIG. 15 corresponds to the case that the polarization axis of the polarizer is perpendicular to the rubbing direction.

The horizontal axis shown in FIGS. 14 and 15 represents the first substrate and has a unit of centimeter, and the vertical axis represents the distance from the first substrate.

A data line 130 and a common electrode 121 thereunder, a pixel electrode 140, a common electrode 121 and a pixel electrode 140 are arranged from the left. The magnitude of the voltage applied to the data line 130 and the pixel electrodes 140 is 7.00 V, and that applied to the common electrodes 121 is zero V.

Resultant orientations of the molecule is represented as a nail, equipotential lines are represented as thin solid lines, and transmittance is represented as thick solid lines. The transmittance shown in FIG. 14 is a little different from that in FIG. 13. That is, the maximum transmittance is 0.840 in FIG. 12, while 0.849 in FIG. 15.

What is claimed is:

1. An in-plane switching liquid crystal display substrate having a plurality pixels, comprising:

a gate line transversely passing through the center of one of the plurality of pixels;

a data line longitudinally passing through the center of the pixel;

a plurality of common electrodes formed in the longitudinal direction and being symmetrical with respect to the gate line and the data line; and a plurality of pixel electrodes formed in the longitudinal direction and being symmetrical with respect to the gate line and the data line.

2. The liquid crystal display substrate of claim 1, further comprising a plurality of common electrode lines formed in the transverse direction, wherein the common electrode lines are connected to the common electrodes and symmetrical to the gate line and the data line.

3. A liquid crystal display substrate comprising:

a transparent insulating substrate;

a plurality of common electrodes formed on the substrate in a first direction;

a gate line formed on the substrate in a second direction;

a gate insulating layer formed on the common electrodes and the gate line;

a pixel electrode formed between the common electrodes in the first direction; and a data line formed on the gate insulating layer along one of the plurality of common electrodes to be overlapped with the gate insulating layer, the data line being connected to the pixel electrode;

wherein the common electrode is transparent.

4. The liquid crystal display substrate of claim 3, wherein the pixel electrode is formed on the gate insulating layer.

5. The liquid crystal display substrate of claim 3, wherein the pixel electrode is made of the same material as the data line.

6. The liquid crystal display substrate of claim 3, further comprising a three-terminal switching element, wherein a first terminal of the switching element is connected to the gate line, a second terminal of the switching element is connected to the data line, and a third terminal of the switching element is connected to the pixel electrode, so that the connection of the data line and the pixel electrode is via the switching element.

7. The liquid crystal display substrate of claim 3, wherein the gate line is made of chromium.

8. A liquid crystal display substrate comprising:

a transparent insulating substrate;

a plurality of common electrodes formed on the substrate in a first direction;

a gate line formed on the substrate in a second direction;

a gate insulating layer formed on the common electrodes and the gate line;

a pixel electrode formed between the common electrodes in the first direction; and a data line formed on the gate insulating layer along one of the plurality of common electrodes to be overlapped with the gate insulating layer, the data line being connected to the pixel electrode;

wherein the edges of the data line lie within the width of the common electrode so that the common electrode is overlapped with the data line.

9. The liquid crystal display substrate of claim 8, wherein the common electrode overlapped with the data line has an opening at central portion.

10. A liquid crystal display substrate comprising:

a transparent insulating substrate;

a plurality of common electrodes formed on the substrate in a first direction;

a gate line formed on the substrate in a second direction;

a gate insulating layer formed on the common electrodes and the gate line;

a pixel electrode formed between the common electrodes in the first direction;

a data line formed on the gate insulating layer along one of the plurality of common electrodes to be overlapped with the gate insulating layer, the data line being connected to the pixel electrode; and a storage electrode formed under the gate insulating layer along the pixel electrode to be overlapped with the pixel electrode.

11. The liquid crystal display substrate of claim 10, wherein the storage electrode is electrically connected to the gate line.

12. The liquid crystal display substrate of claim 10, wherein the storage electrode is transparent.

13. A method for manufacturing a liquid crystal display substrate comprising the steps of:

forming a plurality of common electrodes and a storage electrode between the common electrodes on a transparent insulating substrate in a first direction;

forming a gate line separated from the common electrodes and crossing the storage electrode on the substrate in a second direction;

forming a gate insulating layer;

forming a semiconductor layer on the gate insulating layer at a cross point of the gate line and the storage electrode;

forming two pixel electrodes on the gate insulating layer along the storage electrode, wherein two pixel electrode are symmetrically arranged with respect to the semiconductor layer; and forming a data line along one of the plurality of common electrodes on the gate insulating layer, a first electrode connected to the data line on a center portion of the semiconductor layer, and two second electrodes at both sides of the first electrode, each second electrode connected to respective pixel electrode.

14. The method of claim 13, wherein the storage electrode and the pixel electrodes are made of indium-tin-oxide.

15. The method of claim 13, further comprising the step of forming a doped semiconductor layer on the semiconductor layer.

16. The method of claim 13, wherein the steps of forming the pixel electrodes and forming the data line are performed simultaneously.

17. The method of claim 16, wherein the pixel electrodes are made of chromium.

18. A method for manufacturing a liquid crystal display substrate comprising the steps of:

forming a plurality of common electrodes and a storage electrode between the common electrodes on a transparent insulating substrate in a first direction;

forming a gate line separated from the common electrodes and crossing the storage electrode on the substrate in a second direction;

forming a gate insulating layer;

forming a semiconductor layer on the gate insulating layer at a cross point of the gate line and the storage electrode;

forming a data line along one of the common electrodes on the gate insulating layer, a first electrode connected to the data line on a center portion of the semiconductor layer, two second electrodes at both sides of the first electrode; and forming a pixel electrode connected to the second electrodes on the gate insulating layer along the storage electrode.

19. The method of claim 18, wherein the storage electrode and the pixel electrode are made of indium-tin-oxide.

20. The method of claim 18, further comprising the step of forming a doped semiconductor layer on the semiconductor layer.

21. A liquid crystal display comprising:

a first transparent substrate including at least one pixel thereon;

a gate line on said first transparent substrate, wherein said gate line runs through a central portion of said pixel;

a plurality of pairs of common electrodes on said first transparent substrate, wherein each of said common electrodes is orthogonal with respect to said gate line and wherein each of said common electrodes of a pair are arranged on opposite sides of said gate line;

an insulating layer on said gate line;

at least one pair of pixel electrodes on said first transparent substrate extending from opposite sides of said gate line and orthogonal with respect to said gate line, wherein each pixel electrode of said pair extends between adjacent ones of said common electrodes;

a data line on said first transparent substrate, wherein said data line runs through said central portion of said pixel orthogonal with respect to said gate line and wherein said data line crosses said gate line separated therefrom by said insulating layer; and a thin film transistor on said insulating layer opposite said gate line wherein said thin film transistor electrically connects said data line with said pair of pixel electrodes responsive to a predetermined signal on said gate line.

22. A liquid crystal display according to claim 21 further comprising:

a second transparent substrate spaced apart from said first transparent substrate adjacent said gate and data lines; and a liquid crystal material between said first and second substrates.

23. A liquid crystal display according to claim 21 further comprising:

at least a pair of storage electrodes orthogonal with respect to said gate line, wherein each of said storage electrodes of said pair extends from opposite sides of said gate line and is electrically connected thereto, wherein said insulating layer covers said storage electrodes, and wherein said pixel electrodes are on said insulating layer opposite said storage electrodes.

24. A liquid crystal display according to claim 23 wherein said common electrodes, said storage electrodes, and said pixel electrodes comprise indium-tin-oxide.

25. A liquid crystal display according to claim 21 wherein said data line and said gate line comprise chromium.

26. A liquid crystal display according to claim 21 wherein said pixel is symmetric with respect to said gate line in a first direction and symmetric with respect to said data line in a second direction.

27. A liquid crystal display according to claim 21 wherein said insulating layer covers said common electrodes and wherein said data line is on said insulating layer opposite one of said pairs of said common electrodes.

28. A liquid crystal display substrate having a plurality of pixels, the liquid crystal display substrate comprising:

an insulating substrate;

a gate line on the insulating substrate;

a data line on the insulating substrate, wherein the data line is insulated from the gate line and wherein the data line intersects the gate line;

a plurality of common electrodes on the insulating substrate, wherein the plurality of common electrodes are insulated from the gate line and the data line, and wherein one of the common electrodes overlaps the data line; and a plurality of pixel electrodes on the insulating substrate, wherein the plurality of pixel electrodes are insulated from the common electrodes, and wherein the plurality of pixel electrodes are connected to the gate line and the data line via a switching element.

29. The liquid crystal display substrate of claim 28, wherein the common electrode overlapping the data line has an opening such that a capacitance between the overlapping common electrode and the data line is reduced.

* * * * *